United States Patent
Fokine et al.

(10) Patent No.: US 7,536,876 B2
(45) Date of Patent: May 26, 2009

(54) METHOD FOR FORMING A LONGITUDINAL SOLID BODY WITHIN AN OPTICAL FIBER

(75) Inventors: Michael Fokine, Bandhagen (SE); Lars-Erik Nilsson, Arsta (SE); Asa Claesson, Stockholm (SE); Laurent Krummenacher, Huddinge (SE); Walter Margulis, Huddinge (SE); Leif Kjellberg, Stockholm (SE)

(73) Assignee: Acreo AB, Kista (SE)

( * ) Notice: Subject to any disclaimer, the term of this patent is extended or adjusted under 35 U.S.C. 154(b) by 637 days.

(21) Appl. No.: 10/481,640

(22) PCT Filed: Jul. 2, 2002

(86) PCT No.: PCT/SE02/01312

§ 371 (c)(1),
(2), (4) Date: Aug. 18, 2004

(87) PCT Pub. No.: WO03/005080

PCT Pub. Date: Jan. 16, 2003

(65) Prior Publication Data

US 2004/0258376 A1 Dec. 23, 2004

(30) Foreign Application Priority Data

Jul. 2, 2001 (SE) .................................. 0102381

(51) Int. Cl.
*C03B 37/023* (2006.01)
(52) U.S. Cl. ...................................... 65/385
(58) Field of Classification Search ............. 65/385, 65/393, 139; 385/2.8, 11, 14
See application file for complete search history.

(56) References Cited

U.S. PATENT DOCUMENTS

| | | | | |
|---|---|---|---|---|
| 5,031,805 A | * | 7/1991 | Rohmann | 222/590 |
| 5,240,066 A | * | 8/1993 | Gorynin et al. | 164/461 |
| 5,627,921 A | * | 5/1997 | Lidgard et al. | 385/12 |
| 6,345,131 B1 | | 2/2002 | Jang et al. | |
| 6,358,468 B1 | * | 3/2002 | VanderJagt | 266/239 |

FOREIGN PATENT DOCUMENTS

| | | |
|---|---|---|
| CN | 1278605 A | 1/2001 |
| EP | 0 308 114 | 3/1989 |
| EP | 0 308 114 A2 | 3/1989 |

(Continued)

OTHER PUBLICATIONS

Yagi, High speed spinning of optical fiber, Jan. 20, 1983, Abstract of machine translation of JP 58-009836.*

*Primary Examiner*—Steven P Griffin
*Assistant Examiner*—Queenie Dehghan
(74) *Attorney, Agent, or Firm*—Buchanan Ingersoll & Rooney PC

(57) ABSTRACT

A method of forming a longitudinal solid body within at least one longitudinal hole formed in an optical fiber, comprising the steps of placing a first end and a portion of the optical fiber in a heating chamber; keeping a second end of said optical fiber outside of the heating chamber; forcing a molten material into the longitudinal hole of the fiber from the first end; and thereupon longitudinally extracting the optical fiber from the heating chamber at a controlled rate. Preferably, the fiber is extracted while molten material is being urged into the fiber.

19 Claims, 5 Drawing Sheets

FOREIGN PATENT DOCUMENTS

| | | | |
|---|---|---|---|
| JP | 57132101 A * | 8/1982 | |
| JP | 58 093562 A2 | 6/1983 | |
| JP | 59 215265 A | 12/1984 | |
| WO | WO 90/08970 | 8/1990 | |
| WO | WO00/04416 A | 1/2000 | |
| WO | WO87/07255 A1 | 1/2000 | |

* cited by examiner

METHOD FOR FORMING A LONGITUDINAL SOLID BODY WITHIN AN OPTICAL FIBER

TECHNICAL FIELD

The present invention generally relates to forming of a longitudinal continuous solid body within an optical fiber having at least one longitudinal hole. More particularly, the invention relates to a method of introducing longitudinal electrodes and other solid bodies into an optical fiber. According to the invention, non-conducting materials, such as glass compositions, as well as electrode materials such as metal alloys can be introduced into longitudinal holes of optical fibers to form longitudinal and continuous solid bodies.

TECHNICAL BACKGROUND

Fibers with longitudinal electrodes, i.e. electrodes that run parallel with the fiber core, have various applications. Primarily, such fibers are utilized when it is desired to affect the optical properties of the fiber core by means of the electro-optic effect. By having electrodes close to the fiber core, high electric fields can be produced in said core.

The idea of introducing longitudinal electrodes in an optical fiber has been proposed in the prior art. Typically, the electrodes are arranged in the cladding of the fiber, close to the fiber core.

In the prior art, electrodes in the form of thin wires have been introduced into longitudinal holes of an optical fiber. Such method is very time-consuming and cramped. Furthermore, since the wire electrodes have a diameter that is smaller than the diameter of the holes into which they are introduced, the wires will be curved within the holes. Consequently, the distance to the fiber core, or between two such wire electrodes, will vary along the fiber and therefore give rise to an uncertainty regarding the electrical field produced by an application of voltage to said electrodes.

Another proposed method of manufacturing optical fibers having longitudinal electrodes includes drawing a fiber from a preform comprising electrode material. This method is associated with at least one serious drawback. Namely, the thermal expansion coefficient and the melting point of the electrode material must be essentially the same as those of the fiber material (i.e. the glass composition of which the fiber itself is made). Of course, these restrictions limit the available options of applicable electrode materials.

It has also been proposed to introduce electrode material into a drawn fiber. In this case, the fiber is manufactured with longitudinal holes, running essentially parallel with the fiber core. Electrode material, such as liquid metal, is then sucked into these holes from one end by a vacuum at the opposite end of the fiber.

One method of filling liquid metal into longitudinal holes in an optical fiber is disclosed in the European Patent Application EP 0 308 114 A2. In this method, an optical fiber with spaces therein is used as a starting point. Said spaces are filled with molten metal by placing the fiber in a heated enclosure, with one end of the fiber in the liquid metal and the other end of the fiber in vacuum. The vacuum applied to the fiber then sucks metal into the spaces. When the fiber is cooled, the liquid metal in the spaces solidifies to form solid electrodes.

However, it has been found that the method described in EP 0 308 114 A2 is associated with some serious drawbacks. When the fiber containing the liquid metal is cooled in order for the metal to solidify, the difference in thermal expansion coefficient between the metal and the glass composition of the fiber may cause cracks to appear in the electrodes. Consequently, the electrical conductivity of the longitudinal electrodes is interrupted by such cracks. In other words, the electrodes are fragmented at the solidification process. Furthermore, voids may form in the liquid metal during the filling of the spaces in the fiber, which voids also give rise to discontinuities in the electrodes. In general, the fiber becomes brittle and fragile due to the internal stress.

In order to provide optical fibers having homogenous longitudinal electrodes of high quality, and to avoid brittleness of the fiber, new methods of introducing longitudinal electrodes into optical fibers are desired.

SUMMARY OF THE INVENTION

It is an object of the invention to provide a method of forming longitudinal solid bodies within an optical fiber, by which method problems associated with voids in said solid body are eliminated, or at least reduced to a great extent.

This object is met by a method as set forth in the appended claims.

In particular, the present invention aims to provide a method of introducing electrically continuous solid electrodes into an optical fiber, by which method the above-described problems and drawbacks are essentially eliminated.

Furthermore, the invention aims to provide a method of introducing optically continuous solid bodies into a fiber.

A method of forming a longitudinal solid body in an optical fiber having longitudinal holes formed therein comprises the steps of placing a first end and a portion of the optical fiber in a heating chamber; keeping a second end of said optical fiber outside of the heating chamber; heating the heating chamber to a temperature at which a material to be introduced into said hole is molten; forcing the molten material into the longitudinal hole of the fiber from the first end; and thereupon longitudinally extracting the optical fiber, containing molten material, from the heated heating chamber at a controlled rate.

Longitudinal extraction of the fiber from the heating chamber means that the fiber is extracted essentially in its own longitudinal direction. In this way, the temperature gradient from the heated environment inside the heating chamber to the ambient is parallel to the fiber. Consequently, the molten material inside the holes of the fiber is solidified from one side only such as to avoid formation of voids therein.

Preferably, the fiber is extracted from the heating chamber at a controlled rate while a pressing force is maintained, acting to urge the molten material into the hole of the fiber. In this way, the risk of formation of voids in the material when solidified is further reduced. The fact that molten material is being urged into the hole of the fiber does not necessarily mean that molten material actually flows into the hole. Rather, if additional molten material should be needed in order to compensate for a thermal contraction during the solidification, this is automatically supplied. This kind of additional compensation is allowed by virtue of the solidification being effected from one side only.

By utilizing a pressure to force the liquid material into the longitudinal holes of the fiber, rather than a vacuum at the second end, much higher pressure differences can be obtained between the first and the second end of the fiber. Of course, when utilizing vacuum to suck up a liquid, a maximum pressure difference of about 1 Bar can be obtained.

In one aspect, the invention provides a method of introducing longitudinal electrodes into an optical fiber having at least one longitudinal hole formed therein, by which method homogeneous electrodes can be formed essentially without unintentional discontinuities. The electrodes are introduced into said at least one hole in the fiber in a liquid state, and are subsequently cooled from one side only in a controlled manner to a solid state, such that no unintentional voids are formed in the electrodes.

In another aspect, the present invention provides a method of introducing longitudinal optical bodies into an optical fiber having at least one longitudinal hole formed therein. By the inventive method, optically continuous bodies without any unintentional voids are formed along the fiber.

An insight, forming a basis for the present invention, is that cracks and voids in the longitudinal solid bodies can be avoided if the molten material is made to solidify from one side only. In other words, cracks and voids in the solidified material can be essentially avoided if no portions of material in liquid state are allowed to be enclosed between two solid portions. In this way, the material is essentially prevented from fragmenting when it solidifies. Furthermore, it has been found advantageous to have a pressure urging liquid material into the longitudinal hole of the optical fiber during the solidification of the material. In this way, deteriorating effects from thermal contraction of the material when it is solidified can be essentially avoided, since liquid material is continuously forced into the fiber and fills any spaces that may form during solidification. Hence, the molten material slowly solidifies along the length of fiber, while a pressure difference between the ends of the fiber ensures that voids do not occur along the solid body, which voids could otherwise break electrical or optical continuity of the longitudinal solid body. In short, liquid material is forced into the hole(s) of the fiber from one end, and solidification is effected from the opposite end of the fiber.

The liquid electrodes introduced in the optical fibers may be molten metal or metal alloy. However, the electrodes may also comprise other materials, such as plastic or polymer based electrodes. In addition, other liquid materials that require continuity when solidified may be introduced. One important example is introduction of molten glass compositions into holes in an optical fiber, which glass must maintain continuity when solidified. These glass compositions may, for example, form light guiding cores within the fiber. In this case, it is also of great importance to have a continuous body of material in the fibers.

Fibers with longitudinal electrodes can be utilized in a wide array of applications. By arranging at least two electrodes along the core of an optical fiber, it is possible to subject the fiber core to an electrical field, and thereby alter the optical properties of said core by means of the electro-optic effect. By having the electrodes within the fiber cladding, very close to the core, high electrical fields are achievable. In this way, fiber-based modulators and switches can be made. The electrodes in the fiber may also be utilized for electric field poling of the fiber core, in order to induce a second-order non-linearity therein.

Furthermore, longitudinal electrodes in an optical fiber can be used for feeding electrical power to and from components, such as sensors etc., arranged along the fiber or at its remote end.

Yet another use of longitudinal electrodes along an optical fiber is for heating purposes. By driving a current through one or several electrodes, heating can be effected. Consequently, the characteristics of the fiber may be altered by either temperature or by thermally induced expansion (strain). In addition, it has been found advantageous to have holes filled with Teflon running parallel with the heating electrodes in order to obtain an increased thermal expansion (strain). This may be useful if an enhanced effect is desired, Advantageously, a plurality of electrodes can be formed in an optical fiber. By selectively applying voltage or current to one or some of these electrodes, asymmetrical influence on the fiber can be effected. For example, pressure or an electrical field can be applied to only one of the cores in a twin core fiber in order to alter the optical characteristics of said core only.

Another application of fibers having longitudinal electrodes incorporated therein, is electric field assisted ion exchange. By applying a high electric field between two longitudinal electrodes, diffusion of ions, such as metal ions, into the glass composition of the fiber can be greatly enhanced. By having continuous electrodes according to the present invention, this process can be efficiently carried out over long fibers.

Also, by having pairs of electrodes disposed along the perimeter of the fiber cladding, and short circuiting is each pair of electrodes at a remote end of the fiber, the remote end of the fiber can be aligned remotely by heating the appropriate pair(s) of electrodes. In this way, the thermal expansion of the electrodes causes the tip of the fiber to be displaced from its original position.

An optical fiber with two or more electrodes is also very useful for guiding of microwaves. In essence, the fiber then acts as a combined optical waveguide and microwave waveguide.

By introducing different types of glass compositions into holes of an optical fiber, tailor-made cores can be produced. For example, compositions having melting temperatures lower than that of the original fiber may be introduced. When using introduced glass compositions as the light guiding core of the fiber, it is of course very important to have a completely continuous core without any voids. Therefore, the method according to the present invention is suitable for the introduction and solidification of these compositions.

BRIEF DESCRIPTION OF THE DRAWINGS

Further aspects and advantages of the present invention will be apparent from the following detailed description of some preferred embodiments thereof. In the detailed description, reference is made to the accompanying drawings, on which.

DETAILED DESCRIPTION OF PREFERRED EMBODIMENTS

Figure 1:
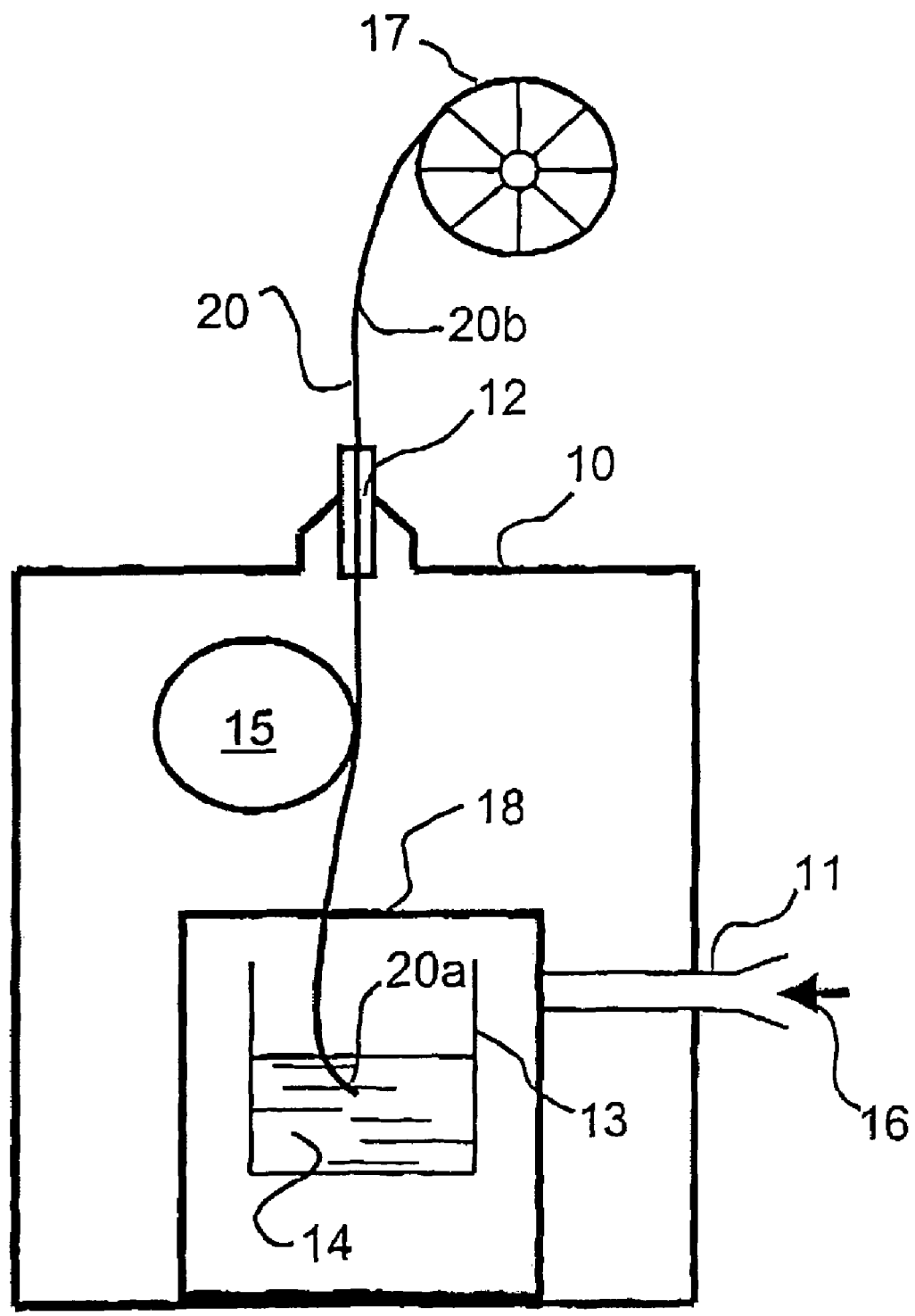
FIG. 1 shows a container with molten electrode material within heating chamber, and an optical fiber placed partly within said heating chamber with one end submerged in the electrode material.

The technique for manufacturing a fiber having longitudinal holes formed therein is known in the art. Briefly, the fiber may be drawn from a preform, in which one or several longitudinal holes have been formed. When the fiber is drawn, the holes remain and a fiber having one or several longitudinal holes is achieved.

A method of introducing longitudinal electrodes into an optical fiber, according to the present invention, will now be described in more detail with reference to FIG. 1. Although the following description is given with reference to electrodes, it is to be understood that other molten materials can be introduced and solidified in a similar manner within the scope of the invention. For example, as mentioned above, glass compositions may be introduced into the hole of the optical fiber.

An apparatus for introducing longitudinal electrodes into an optical fiber having at least one longitudinal hole formed therein comprises a heating chamber 10 having a high pressure inlet 11 and a through-hole 12 for the optical fiber 20. The through-hole 12 may comprise a pipe or similar, which is adapted to promote a short temperature gradient out from the heating chamber and hence unambiguous cooling of the fiber when it is extracted therefrom. Said pipe may also comprise means for actively controlling the temperature gradient between the heating chamber and the ambient. Within the heating chamber 10, there is a container 13 with liquid electrode material 14, preferably molten metal. The container 13 is placed within a pressure cell 18, which is in communication with the high pressure inlet 11. A portion of the optical fiber 20 is placed within the heating chamber 10. A first end 20a of the optical fiber 20 is submerged into the liquid electrode material 14, and a second end 20b of the fiber is positioned outside of heating chamber 10. The portion of the fiber to be filled with electrode material resides inside the heating chamber 10. If necessary, said portion could be supported on a drum 15 or similar in order to facilitate collection of the fiber 20 inside the heating chamber 10, and extraction of the fiber there from. In addition, a second drum 17 may be provided outside of the heating chamber. The second drum 17 is suitably utilized for collection of the fiber on the outside, as well as for effecting the extraction of the fiber from the heating chamber. Furthermore, the pressure cell 18 has an air tight via hole for the fiber 20.

The interior of the pressure cell 18 is pressurized by application of a high pressure on the high pressure inlet 11, as indicated by an arrow 16. The pressure may be about 5 to about 15 Bar. The first end of the fiber 20a is placed within the pressure cell 18 at elevated temperature and pressure, and submerged into molten material 14, while the other end 20b of the fiber resides outside of the heating chamber 10 at ambient temperature and pressure. Hence, when the pressure cell 18 is pressurized by introducing a gas through the high-pressure inlet 11, a pressure difference is obtained between said first end 20a and said second end 20b of the optical fiber 20. In this way, molten-electrode material 14 is urged into the longitudinal hole(s) of the fiber. A conceivable electrode material is Sn—Bi alloy, which has a melting temperature of about 137 degrees centigrade. Typically, for this particular material, the temperature within the heating chamber and hence the interior of the pressure cell 18 is about 150 degrees centigrade.

When pressure is applied to the cell 18, liquid electrode material begins to flow into the longitudinal holes of the fiber 20 from the first end 20a. Successively, a larger portion of the fiber 20 is filled with electrode material 14. It is to be noted that as long as electrode material flows through a portion of the fiber that is inside the heating chamber 10 at a sufficiently elevated temperature, solidification of the electrode material is prevented. Hence, the portion of the fiber within the chamber 10 will be filled with electrode material. When electrode material that is forced through the holes in the fiber reaches the through-hole 12, solidification initiates due to the ambient temperature, which is lower than the temperature inside the heating chamber and also lower than the melting temperature of the electrode material 14.

More than 20 meters of continuous electrodes in an optical fiber have been formed by this method. The speed at which electrode material flows into the holes of the fiber varies with the diameter of the holes, the temperature of the heating chamber, the pressure difference and the type of electrode material used. With the specifications given above, and at a pressure within the pressure cell 18 of about 8 Bar, one meter of fiber was filled with electrode material in a few minutes.

Once solidification has occurred close to said through-hole 12, the flow of electrode material through the fiber 20 halts. However, due to the high pressure inside the heating chamber 10, there is still a force urging electrode material 14 into the fiber 20.

It is to be noted that the through-hole 12 constitutes a temperature drop region, in which the temperature gradually drops towards the outside of the heating chamber. In some cases, it might be preferred to control the temperature in this temperature drop region, such that a known temperature gradient is obtained. One particularly preferred way of controlling said temperature gradient is to ensure that it is substantially parallel to the longitudinal dimension of the fiber during extraction and that the melting temperature of the material introduced into the hole of the fiber is traversed within said temperature drop region. In this way, it is ensured that solidification of the molten material, during the extraction of the fiber from the heating chamber, is effected only within this temperature drop region. This may further enhance the quality and homogeneity of the solid body formed within the fiber.

Next, longitudinal extraction of the fiber 20 from the heating chamber 10 through said through-hole 12 is initiated. By extracting the fiber 20 from the heating chamber 10 longitudinally at a controlled rate, successive solidification of the liquid electrode material 14 is effected from one side only, i.e. closest to the second end 20b of the fiber. Hence, no portion of liquid electrode material is enclosed between any two portions of solid electrode material. Should, during the solidification, any contraction of the electrode material 14 occur, more electrode material is automatically introduced into the fiber 20 by the pressure inside the cell 18. Consequently, a homogenous and solid electrode is formed within the holes of the fiber 20.

Figure 2:
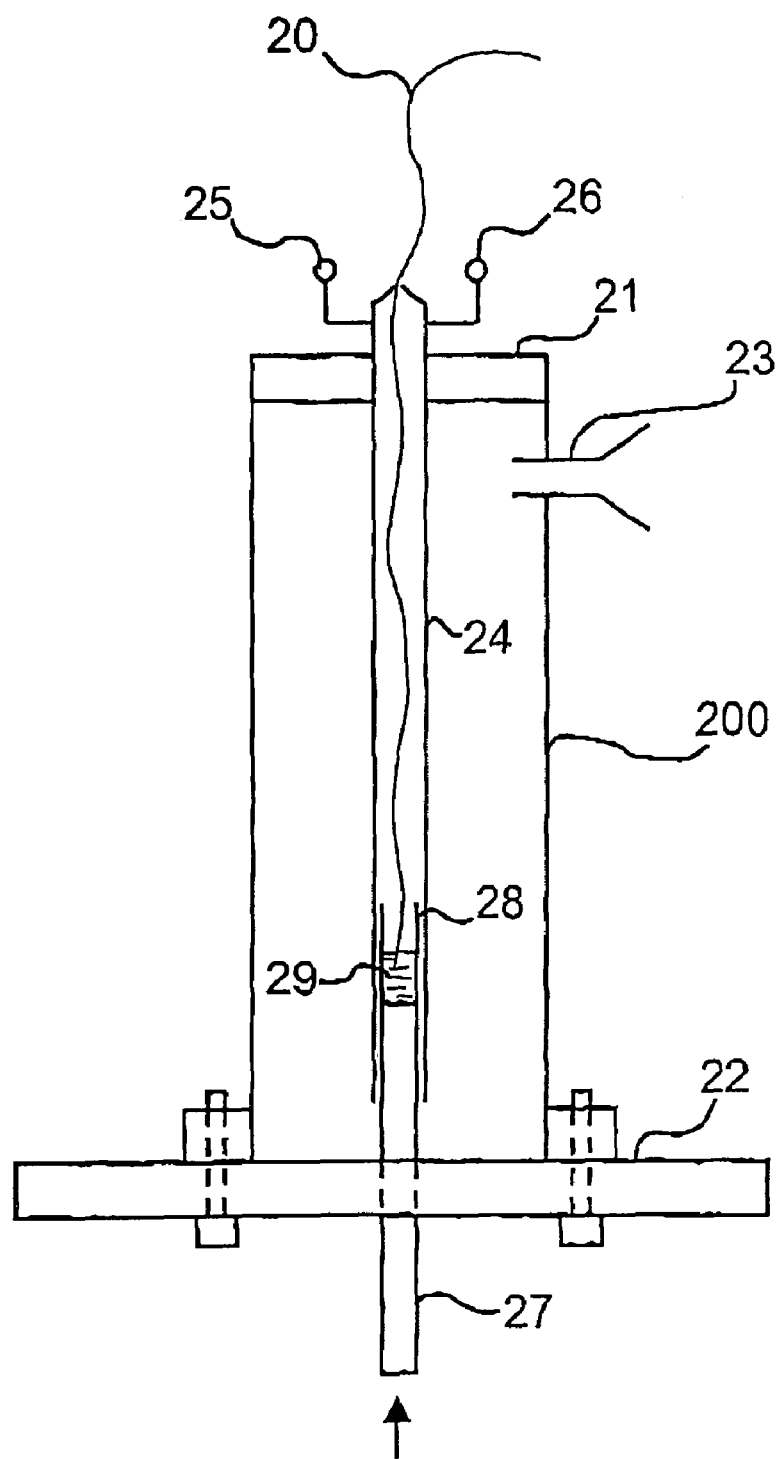
FIG. 2 shows a tube-type furnace within a pressure chamber.

Another apparatus for introduction of longitudinal electrodes into an optical fiber is schematically shown in FIG. 2. The apparatus shown in FIG. 2 is designed to allow higher temperatures than the apparatus of FIG. 1. In this case, a tube-type furnace is arranged within a pressure chamber. The shown arrangement allows the temperature at the enclosure of the pressure chamber to be relatively low. In fact, the temperature of the enclosure, and its inlet of high-pressure and its through-hole for the optical fiber may be as low as the ambient temperature (room temperature).

The apparatus of FIG. 2 comprises a cylindrical housing 200 of stainless steel. The housing 200 is sealed at the top and at the bottom by an upper lid 21 and a lower lid 22. The housing is provided with a high-pressure inlet 23, for pressurizing the interior of the housing. A tube-type furnace 24 is arranged inside the pressure chamber. The furnace 24 is a ceramic cylinder, which has wire or ribbon resistors (not shown) along its length. Said resistors have outside connections 25 and 26, to which a driving power for the furnace is applied. In a typical example, the driving power is 10 V at 250 A, which could give a temperature within the tube-type furnace of about 1000 degrees centigrade. Preferably, the upper portion of the furnace 24 is not heated, in order to avoid high temperatures close to the upper lid 21. The space between the ceramic cylinder, constituting the furnace 24, and the cylindrical housing 200 is preferably filled with some medium providing thermal isolation. The bottom lid 22 has a passage through which a raising pillar 27 is movable. A container 28 with liquid electrode material 29 is mounted on the raising pillar 27. By moving the raising pillar 27 vertically, different fiber length can be fitted into the tube-type furnace 24. In order to further reduce the temperature of the stainless steel housing 200, water cooling may be employed.

By means of the arrangement shown in FIG. 2, materials of comparatively high melting temperatures (about 1000 degrees centigrade) can be introduced into an optical fiber.

As described, FIG. 1 shows an arrangement wherein a pressure cell inside the heating chamber is pressurized, whereas FIG. 2 shows an arrangement wherein a tube-type oven (i.e. a heating chamber) is arranged inside a pressure chamber. In addition, it is of course conceivable to utilize a heating chamber that is pressurized in itself, the cell 18 and the heating chamber 10 in that case being the one and same entity.

Although the method of introducing longitudinal electrodes into an optical fiber according to the present invention greatly reduces the risk of voids forming in the electrode material, some risk of voids may still remain. In case the electrical conductivity of any electrode should be below standard, due to the presence of voids therein, measures could be taken to repair such discontinuities. To this end, according to the present invention, a high voltage is applied to the electrode. The voltage is adjusted to be sufficiently high for sparks to occur over said discontinuities. These sparks induce a local heating of the electrode material close to the voids. In effect, the electrode material is heated to above its melting temperature, and the void of the electrode is repaired by melted electrode material flowing into the empty gap.

In some cases, it is desired to have continuous but separated portions of fiber provided with electrodes. For example, if the fiber is to be cut into shorter lengths after the electrodes have been introduced therein, it is sometimes preferred to have portions of the longitudinal holes in the fiber empty, i.e. without electrode material. In particular, when the lengths of fibers are to be spliced to another piece of fiber, the presence of electrode material close to the joint might obstruct the splicing process. In such cases, gas pockets are straightforwardly introduced in the longitudinal holes of the fiber by intermittently removing the first end 20a of the fiber 20 from the liquid electrode material 14. This could be done, for example, by lifting the fiber end 20a, or by lowering the container 13 in which the electrode material 14 is kept. The vertical position of the container 13 can be controlled by means such as the raising pillar 27, shown in FIG. 2. The pillar 27, in turn, may advantageously be magnetically controlled from the outside of the pressure chamber and the heating chamber.

Furthermore, it is also conceivable to have two or more different, substantially immiscible, liquids within the container 13 in a stratified configuration. Portions of electrode material (e.g. metal) in the fiber can then be separated by portions of an insulating material (e.g. glass or plastic). For instance, within the container 13, there could be a layered contents of molten metal and molten low-temperature glass. By moving the first end 20a of the fiber 20 between the molten metal (forming an electrode material) and the molten low-temperature glass, fiber portions containing metal are separated by portions containing low-temperature glass. The fiber can subsequently be cut into separate pieces with longitudinal electrodes, each piece being terminated at the ends thereof by a respective metal-free portion. In this way, splicing is simplified as compared to a fiber having metal electrodes all the way to the ends.

Also, two or more different kinds of metals could be introduced into the holes of the fiber. One example is when two metals of different melting temperatures are introduced. When the prepared fiber is heated by driving a current through the electrodes, one of said metals may melt, while the other remains solid. By operating at or near the melting temperature of a metal, pronounced changes in thermal expansion are obtained when the metal solidifies/melts.

It is to be understood that the cross-sectional shape of the longitudinal holes in the fiber may be designed at will, by appropriately forming the preform from which the fiber is drawn.

Figure 3:
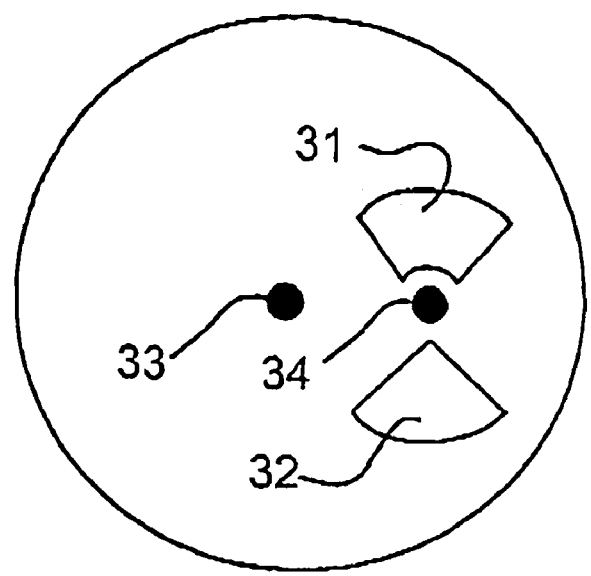
FIGS. 3 to 8 show different configurations of cores and longitudinal holes in an optical fiber.

In FIG. 3, an embodiment having non-circular holes 31 and 32 is shown. The shown fiber has two light guiding cores 33, 34 and two longitudinal electrodes formed in said holes 31 and 32. The shape of the holes, and hence of the electrodes introduced therein, are designed in order to maximize an electric field in the fiber core 34 for the purpose of electric poling or for optical modulation by means of electric field. The cross-sectional shape of the holes, and the placement of the same close to one of the cores, ensure that an applied electrical field affects primarily only the intended core 34.

The method of forming a longitudinal solid body within a hole formed in an optical fiber according to the present invention may also comprise a preconditioning step, in order to reduce the contents of micro-bubbles in the molten material. One way of preconditioning the molten material for this purpose is to increase the temperature of the melt, and at this elevated temperature stir the melt or subject the melt to ultrasound, such that bubbles of air or other gases may surface and leave.

Before forcing the molten material into the holes of the fiber, it may also be desired to subject the fiber to a process, in which free bonds at the surface of the holes are removed, such as silanization. Thereby, adhesion of the molten material to the inner walls of the holes is lowered, which makes introduction of the molten material into the holes easier Silanization of glass is a technique known in the art.

Figure 4:
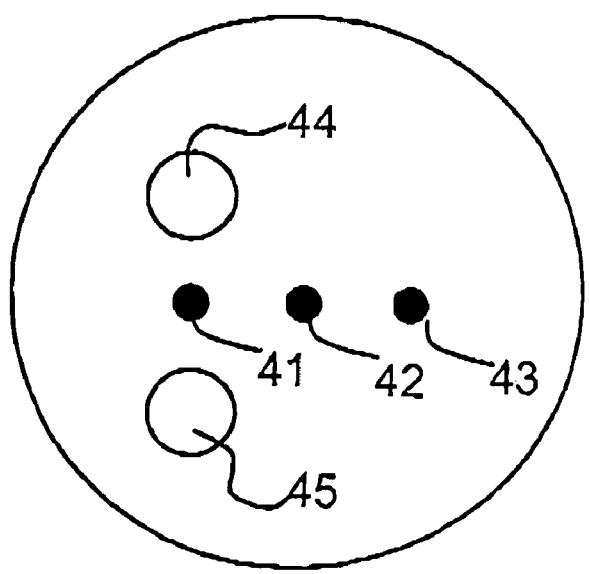

For the purpose of introducing the electrode material into the holes of the fiber, the placement and the shape of the holes are irrelevant. In FIG. 4, another design of three cores 41, 42, 43 and two holes 44, 45 is schematically shown. In the case shown in FIG. 4, one of the cores 42 is placed centrally in the fiber, and two of the cores 41 and 43 are placed off center. In addition, the electrodes are of circular shape, and arranged at one core 41 of said off center cores. A device based on the fiber configuration shown in FIG. 4 can serve as a Mach-Zender interferometer, wherein the optical characteristics of core 41 are tuned in order to control the coupling of light between the cores. Splicing to a standard one-core fiber is facilitated by letting output light enter the center core 42, which is spliced to the core of the standard fiber. The electro-optic effect in the Mach-Zender interferometer can be doubled by having additional electrodes affecting also the other off-center core (e.g. on both sides thereof). The electrical polarity of the electrodes at the respective off center core should be opposite, such that a "push-pull" configuration is achieved.

The method of introducing longitudinal electrodes into an optical fiber according to the present invention is readily applied regardless of the location or shape of the holes. However, as regards the application of the hence produced fiber, electrode placement may be very important. Below, a number of applications of fibers with electrodes will be described.

Figure 5:
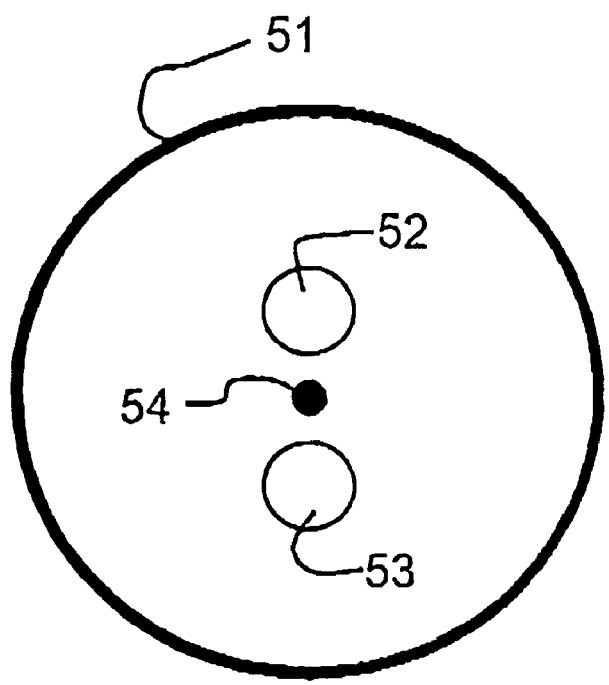

A first application of a fiber with longitudinal electrodes is electric field poling of the fiber core. As known in the art, electric field poling of glass induces an optical non-linearity of the second order in the normally amorphous glass. When poling glass in this manner, very high electric fields are required. Basically, non-linearity is introduced into the glass by migration of cations, such as sodium ions. As cations are of positive charge, they tend to be driven away from the positive electrode (the anode). Consequently, it is preferred to have the anode very close to the region to be poled (i.e. the fiber core). At the same time, however, it is important to avoid flashover between the electrodes. Therefore, the negative electrode (the cathode) may not be placed too close to the positive electrode. By recognizing that poling of glass is primarily driven by the anode, placement of the cathode can be made-with more freedom. Therefore, in one application of a fiber having two longitudinal electrodes formed therein, one of these electrodes is used as the anode in a poling process. The cathode is formed by a circumferential coating on the fiber, preferably-comprised of metal such as silver or gold. This situation is schematically shown in FIG. 5. The cathode used for poling is shown as a thick circumferential line 51, and the cathode and anode used for tuning the poled device are shown at 52 and 53. By the shown arrangement, the core 54 of the fiber can be poled at very high electric fields close to the anode, and still allow of efficient tuning of the poled device be means of the electrodes 52 and 53.

Later, when the non-linearity of the fiber is utilized for affecting the optical characteristics of the core, an electrical field is applied between the two longitudinal electrodes within the fiber. A well defined electrical field is produced in the fiber core in this way. Thus, one of the longitudinal electrodes and the circumferential electrode is utilized during poling, and the two internal longitudinal electrodes are used during subsequent operation of the poled device.

Figure 6:
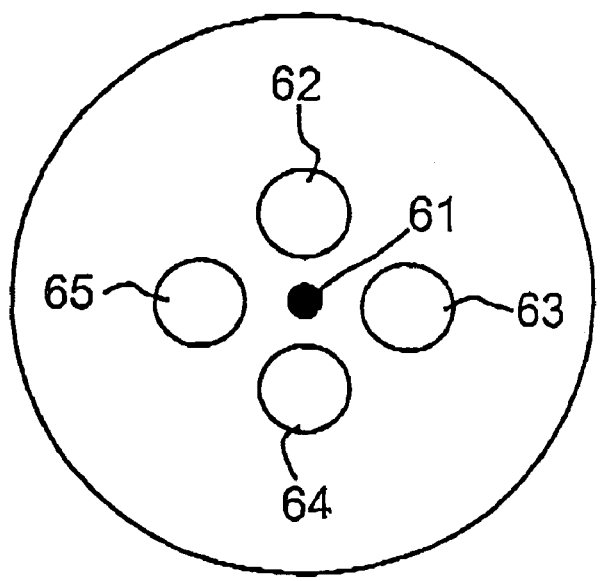

In another application, birefringence in the fiber core is altered in a controlled manner by means of pressure from the electrodes when electrically heated. This situation is schematically illustrated in FIG. 6. The fiber shown in the figure comprises one core 61 and four longitudinal electrodes 62-65. Asymmetrical strain can be induced in the fiber core 61 by applying a current to either of the electrodes 62 to 65. The applied current causes heating of the respective electrode, which will be subjected to thermal expansion. By selectively applying current to the electrodes, and thereby induce thermal expansion, the pressure or strain in the fiber core can be controlled as desired. Possibly, different current levels are applied to different electrodes, whereby the possibility of tuning the pressure/strain in the core is further enhanced.

Figure 7:
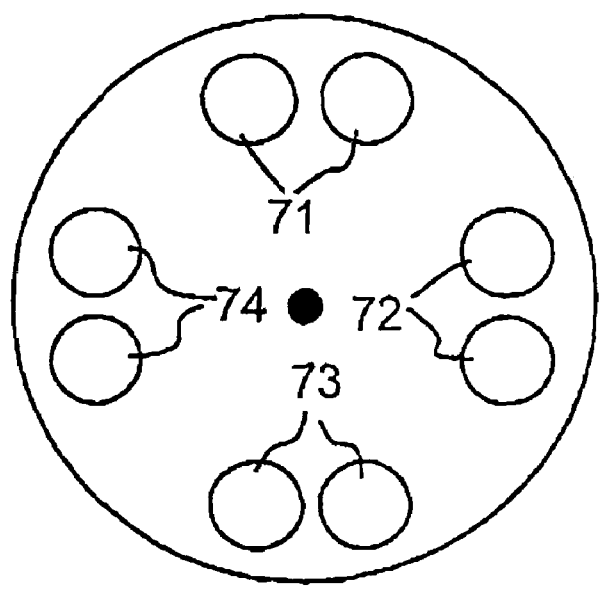

In another embodiment, as shown schematically in FIG. 7, the longitudinal electrodes in the fiber are utilized for remote positioning of the fiber tip. As shown, the fiber comprises four pairs of electrodes 71-74 in the fiber cladding. Each of said pairs is short-circuited at the remote end of the fiber. By applying a current to either of the pairs, thermal expansion of said pair is effected. By consequence, the fiber tip is pushed away from the heated electrode pair. Selective heating of the electrode pairs enable remote positioning of the tip of the fiber by applying control signals (i.e. heating currents) at the other end. In this way, the fiber tip may be aligned to other optical devices such as a diode laser, another fiber or a photodetector. Moreover, the fiber may be directed towards various types of targets to be irradiated by light. The fiber may also be positioned for accurate treatment of body tissue, for example when irradiating tumors inside a human body.

Fibers having longitudinal electrodes may be advantageously utilized when it is necessary to send signals to a remote end of the fiber, or to receive signals from the remote end of the fiber. A fiber with electrodes of this kind actually constitutes a combined electrical and optical conductor (wire).

By operating the fiber with electrodes at a temperature in the vicinity of the melting temperature of the electrode material, sudden effects can be obtained when the electrode material is melted or solidified. For example, it has been shown that the pressure (strain) exerted by the heated electrode material quickly drops when it is heated above the melting temperature. If employed in, for example, a Mach-Zender interferometer, sudden amplitude changes can be effected at this transition between solid and liquid phase. This effect is even more efficiently employed when using eutectic alloys, i.e. alloys that melt and solidifies at a fixed temperature essentially without any melting range.

Referring again to FIG. 6, a fiber having four longitudinal electrodes is shown. By selectively applying a current to at least one of the electrodes, anisotropic strain may be induced in the fiber core, as briefly explained above. This may be utilized, for example, for compensation of polarization mode dispersion in optical communications.

If a grating is incorporated into the core of the fiber, the period of this grating may be tuned remotely by means of longitudinal electrodes. A selected portion of the fiber may be heated (tensioned) in order to tune the characteristics of the grating in its core. Hence, by employing continuous longitudinal electrodes within an optical fiber, tunable filters may be realized.

By having a fiber with at least two cores, the coupling between the cores can be tuned. In addition, by having a fiber with at least two electrodes, heating by means of a traveling pulse can be effected. In this case, non-uniform heating is obtained due to the gradual attenuation along the electrodes in the fiber. For example, this non-uniform heating could be utilized for inducing a chirp into an initially uniform grating, or for tuning the dispersion of a chirped grating.

Another attractive application of an optical fiber with at least two longitudinal electrodes is remote gas analysis. For example, the remote end of the fiber may be positioned within an atmosphere to be analyzed. Then, a high voltage is applied to said at least two electrodes, whereby a spark is produced at the remote end. This spark may be operative to ionize the gas to be analyzed. The light emitted by the ionized gas can then be collected by the fiber core, and analyzed remotely. In this way, analysis in harsh environments can be performed.

Figure 8:
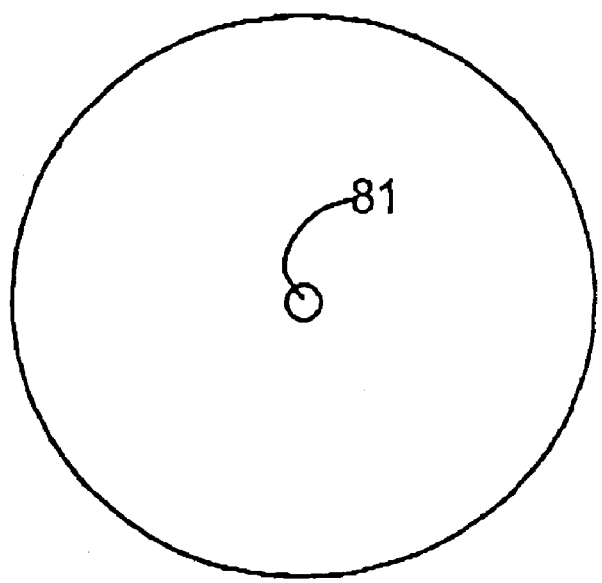

FIG. 8 schematically shows a cross-section of a fiber having a centrally placed hole 81. Typically, such hole is filled with an optical material, such as glass, in order to form a light guiding core in the fiber. By virtue of the possibility to introduce said core after the fiber has been drawn, the characteristics of said core can be tailor made in various ways.

Although the above description of preferred embodiments of the invention is exemplified by means of longitudinal holes in the cladding of the fiber, it is to be understood that holes may also be formed within the core of the fiber. For example, a longitudinal hole may be formed centrally in the fiber. Furthermore, it is to be noted that both electrode material and other materials, such as glass compositions, may be introduced into holes in an optical fiber by means of the inventive method. The method according to the present invention is suitable for every introduction of liquids into capillary holes where the liquid is subsequently cooled to solid form.

The invention claimed is:

1. A method of forming a longitudinal solid body within an optical fiber having at least one longitudinal hole, comprising the steps of:

placing a first end and a portion of the optical fiber in a heating chamber;

keeping a second end of said optical fiber outside of the heating chamber;

heating the heating chamber to at least a temperature at which a material to be introduced into said hole is molten;

forcing the molten material into the longitudinal hole of the fiber from the first end; and thereupon longitudinally extracting the optical fiber, containing molten material, from the heated heating chamber at a controlled rate in order to solidify the molten material in the at least one longitudinal hole from one end of the fiber only, wherein the step of extracting the optical fiber from the heating chamber is performed while a pressing force is maintained, acting to urge the molten material into the hole of the fiber from the first end thereof.

2. A method as claimed in claim 1, wherein a molten electrode material is used, the longitudinal solid body thereby being a longitudinal electrode.

3. A method as claimed in claim 2, wherein the electrode material is a metal or an alloy of metals.

4. A method as claimed in claim 2, further comprising the step of submerging the first end of the fiber in molten material.

5. A method as claimed in claim 1, wherein a molten optically transparent material is used, the longitudinal solid body thereby being comprised of an optically transparent material.

6. A method as claimed in claim 1, further comprising the step of submerging the first end of the fiber in molten material.

7. A method as claimed in claim 1, further comprising the step of controlling the temperature gradient in a temperature drop region where the fiber is extracted from the heating chamber.

8. A method as claimed in claim 7, wherein the temperature gradient is controlled such that solidification of the molten material within the fiber takes place only within the temperature drop region.

9. A method as claimed in claim 8, wherein the temperature gradient is substantially parallel to the longitudinal direction of the fiber.

10. A method as claimed in claim 7, wherein the temperature gradient is substantially parallel to the longitudinal direction of the fiber.

11. A method as claimed in claim 1, wherein the step of forcing a molten material into the hole of the fiber is effected by means of pressurizing a pressure cell in which the first end of the fiber is placed and submerged in molten material.

12. A method as claimed in claim 11, wherein the pressure cell is pressurized to between 5 Bar and 15 Bar.

13. A method as claimed in claim 12, wherein the pressure cell is pressurized by injecting a gas into said cell.

14. A method as claimed in claim 11, wherein the pressure cell is pressurized by injecting a gas into said cell.

15. A method as claimed in claim 14, wherein the gas injected into the pressure cell is essentially free of oxygen, in order to prevent oxidation of the molten material.

16. A method as claimed in claim 1, further comprising the step of preconditioning the molten material such as to reduce the contents of bubbles, before forcing said material into the hole of the fiber.

17. A method as claimed in claim 1, wherein the optical fiber is subjected to a process in which free bonds at the surface of said at least one longitudinal hole are removed, prior to the step of forcing the molten material into the hole of the fiber, in order to reduce the adherence of said material to the wall of the hole.

18. A method as claimed in claim 1, wherein voids are intentionally introduced between continuous portions of molten material by intermittently interrupting the forcing of molten material into the hole of the fiber.

19. A method as claimed in claim 1, wherein continuous portions of different material are formed by moving the first end of the fiber between two or more different liquids while forcing said liquids into said at least one longitudinal hole of the fiber.

* * * * *